(12) United States Patent
Strömberg et al.

(10) Patent No.: US 11,371,389 B2
(45) Date of Patent: Jun. 28, 2022

(54) DIVOT FOR OUTER CASE SHROUD

(71) Applicant: GKN Aerospace Sweden AB, Trollhättan (SE)

(72) Inventors: Henrik Strömberg, Trollhättan (SE); Martin Rembeck, Trollhättan (SE); Mikael Nordström, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 156 days.

(21) Appl. No.: 16/650,468

(22) PCT Filed: Sep. 26, 2018

(86) PCT No.: PCT/EP2018/076164
§ 371 (c)(1),
(2) Date: Mar. 25, 2020

(87) PCT Pub. No.: WO2019/063635
PCT Pub. Date: Apr. 4, 2019

(65) Prior Publication Data
US 2020/0240292 A1    Jul. 30, 2020

(30) Foreign Application Priority Data

Sep. 26, 2017    (GB) ...................................... 1715576

(51) Int. Cl.
*F01D 25/24*    (2006.01)
*F01D 25/16*    (2006.01)
(Continued)

(52) U.S. Cl.
CPC ........... *F01D 25/24* (2013.01); *F01D 25/162* (2013.01); *F01D 25/28* (2013.01); *F01D 25/30* (2013.01);
(Continued)

(58) Field of Classification Search
CPC . B23K 2101/001; F01D 25/162; F01D 25/24; F01D 25/28; F01D 25/30;
(Continued)

(56) References Cited

U.S. PATENT DOCUMENTS 4,677,828 A  *  7/1987  Matthews .............. F04D 29/541
                                                        60/751
4,993,918 A      2/1991  Myers et al.
(Continued)

FOREIGN PATENT DOCUMENTS

CN    103306818 A    9/2013
EP    1882827 A2     1/2008
(Continued)

OTHER PUBLICATIONS

International Search Report and Written Opinion for PCT/EP2018/076164 dated Nov. 20, 2018 (13 pages).
(Continued)

*Primary Examiner* — Jesse S Bogue
(74) *Attorney, Agent, or Firm* — Bejin Bieneman PLC

(57) ABSTRACT

The invention concerns a turbine exhaust casing (TEC) for a gas turbine engine in which portions of the inner surface of the casing against which exhaust gas flows are provided with recesses extending into the surfaces. The recesses are positioned proximate to the leading edges of struts which extend between an outer shroud and inner hub of the casing.

14 Claims, 10 Drawing Sheets

(51) Int. Cl.
*F01D 25/28* (2006.01)
*F01D 25/30* (2006.01)

(52) U.S. Cl.
CPC .... *F05D 2220/323* (2013.01); *F05D 2240/14* (2013.01); *F05D 2240/50* (2013.01); *F05D 2260/94* (2013.01)

(58) Field of Classification Search
CPC ............... F01D 5/143; F05D 2220/323; F05D 2240/14; F05D 2240/50; F05D 2240/91; F05D 2260/94; Y02T 50/60
See application file for complete search history.

(56) References Cited

U.S. PATENT DOCUMENTS

| | | | | |
|---|---|---|---|---|
| 8,444,378 | B2* | 5/2013 | Clemen | F04D 29/681 415/144 |
| 8,776,533 | B2* | 7/2014 | Feindel | F01D 25/162 60/796 |
| 9,512,740 | B2* | 12/2016 | Orosa | F01D 25/30 |
| 9,732,674 | B2* | 8/2017 | Sakamoto | F01D 5/143 |
| 2012/0204569 | A1 | 8/2012 | Schubert | |

FOREIGN PATENT DOCUMENTS

| | | |
|---|---|---|
| EP | 1854989 A3 | 7/2011 |
| EP | 2365191 A1 | 9/2011 |
| EP | 2679793 A1 | 1/2014 |
| EP | 3040521 A1 | 7/2016 |
| JP | 2004052598 A | 2/2004 |
| JP | 2014194221 A | 10/2014 |
| WO | 2014105100 A1 | 7/2014 |
| WO | 2014105599 A1 | 7/2014 |
| WO | 2014105621 A1 | 7/2014 |
| WO | 2015142200 A1 | 9/2015 |

OTHER PUBLICATIONS

UKIPO Search Report for Application No. GB1715576.3 dated Jan. 23, 2018 (5 pages).
China National Intellectual Property Administration Office Action dated Mar. 14, 2022 for related Chinese Application No. 201880062808.9 (14 pages; with English translation).

* cited by examiner

DIVOT FOR OUTER CASE SHROUD

CROSS-REFERENCE TO RELATED APPLICATIONS

This application is a national stage of, and claims priority to, Patent Cooperation Treaty Application No. PCT/EP2018/076164, filed on Sep. 26, 2018, which application claims priority to Great Britain Application No. GB 1715576.3, filed on Sep. 26, 2017, which applications are hereby incorporated herein by reference in their entireties.

BACKGROUND

Gas turbine components, such as for example a turbine exhaust casing (TEC), are subjected to extreme temperature differentials during operation. For example, a TEC may be elevated from ambient temperature conditions to temperatures in excess of 600 degrees C. during operation. Aircraft engines are particularly prone to high temperatures during a taxi to or from a run-way when airflow can be low and ambient air temperature high. These temperature differentials can create thermally induced stresses in the engine components such as the shroud casing. The problem is compounded over time by the cyclical effect of loading which can dramatically reduce fatigue life.

To address these conditions components such as the TEC must be designed to accommodate high temperatures and high stresses. Of particular concern to aero engine designers are the portions of the TEC where the radial struts (connecting the outer shroud to the inner hub) are mechanically connected at either end to the shroud and hub. The connection of struts to shroud and hub must be carefully engineered to accommodate the cyclical loads and temperatures whilst also optimising the aerodynamic performance of the TEC. The TEC is designed such that the struts have an aerodynamic profile which acts to control the exhaust gas leaving the combustors without inhibiting exhaust gas flow.

The skilled reader will be familiar with the operation and construction of a gas turbine engine.

However, to summarise the operation, a typical engine comprises a pair of compressors, namely a first upstream low pressure compressor and a second, downstream, high pressure compressor. The pair of compressors compress air entering the air intake of the engine in two-stages before the compressed gas is communicated into the combustors where fuel is introduced and combusted with the compressed air. Exhaust gas leaving the combustors impinges first on a high pressure turbine (which rotates the compressors) and then secondly on a low pressure turbine (which rotates the fan of a turbofan engine). Exhaust gas then leaves the rear of the engine.

The exhaust gas exiting the low pressure turbine leaves the aft of the turbine through a turbine exhaust casing (TEC). The operation of a gas turbine engine is well known to a person skilled in the art who will also be familiar with the arrangement of a conventional TEC which comprises an inner circumferential casing portion (a hub portion) and an outer circumferential casing portion (a shroud portion).

A plurality of radially extending struts extend between the inner hub and the outer shroud and provide structural support between the two portions. The struts are mechanically coupled to the hub at a radially inward end (measured from a central rotational axis of the engine) and to the shroud at a radially outward end (again measured from the central rotational axis of the engine).

SUMMARY

Disclosed and claimed herein is a design of struts their coupling to a hub and shroud. The arrangement reduces the stress at the interface between the strut and shroud and enhances fatigue life. This thereby allows for material optimisation which ultimately allows for a reduction in the weight of the TEC (or similar casing component) and overall engine weight. Although the present disclosure is primarily concerned with a turbine exhaust casing it will be recognised that the arrangement may equally be applied to other static casing components in a gas turbine engine, generator or a compressor.

According to a first aspect there is provided a turbine exhaust casing for a gas turbine engine comprising an outer generally cylindrical shroud and an inner generally cylindrical hub and a plurality of struts extending radially between the shroud and the hub, each strut intersecting with the shroud at a first end and the hub at an opposing end, wherein the outer surface of the hub and the opposing inner surface of the shroud define a channel through which gas may pass, and wherein a portion of the surface of the channel at the intersection of the channel and strut is recessed with respect to the surface of the channel surrounding the intersection.

Thus, as described herein the inner surface of the flow channel is adapted in a counterintuitive way. Specifically, the normally uninterrupted inner surface of the flow channel is provided with radially inwardly extending or radially outwardly extending recesses or 'divots' in a predetermined zone adjacent to a leading or trailing edge of a strut or vane. Another way to define the recess is a smooth concave zone formed into the channel surface.

The concave zones may be located at four positions with respect to the respective strut or vane as follows:

Extending radially inwardly into the hub at a leading edge (LE) or trailing edge (TE) of a vane or strut; or Extending radially outwardly into the shroud at a leading edge or trailing edge of a vane or strut.

The concave zones or recesses may extend radially outwardly at the intersection of strut and shroud and radially inwardly at the intersection of strut and hub.

Advantageously the recesses may be in the form of a generally concave recess extending into the surface of channel (that is the hub or shroud) and comprise a continuous and smooth surface. Specifically, the recesses may be configured to have a substantially smooth intersection with the area of channel surrounding the recess. This advantageously minimises any aerodynamic disruption and maintains a laminar flow of air over the surface of the channel and recess.

Conventionally any interference with the inner surface of the air channel has been carefully avoided. However, the presently described change in profile of the channel at the leading and/or trailing edges of the strut or vane reduces the stress which is induced within the strut or vane during operation of the engine. This allows the strut to be smaller and lighter since it is not required to withstand higher loads. Given that there are a plurality of such struts in the TEC this can make a significant contribution to weight reduction in the engine.

As described above, to minimise any detrimental effect of the recesses in the channel, the recess is arranged to merge smoothly and continuously with the surface of the channel. This prevents delamination and optimises the advantageous effects of the invention.

Specifically, the periphery of the recess(es) intersect(s) with the surrounding surface of the channel as a continuous and smooth surface. Thus, the strut intersects with shroud and hub with a smooth radius (R) extending between the outer surface of the strut and the generally cylindrical inner surfaces of the shroud and hub and further intersects with the continuous and smooth surface of a respective recess.

It has been established that the following characteristics allow for an optimal arrangement of strut and casing profile:
the radius of curvature between the strut and the normal surface of the channel has a radius of $R_F$;
the strut has a maximum width measured perpendicular to its length of $S_W$;
the strut has a length between its leading edge and a point of maximum thickness ($S_W$) of the strut of $S_A$; and
wherein the outer periphery of each recess is located within a region defined by:
(a) $2 \times S_A$ from the leading edge of the strut measured away from the strut in an upstream or downstream direction; and
(b) $(S_W + R_F)/2$ measured perpendicularly from a centre line running through the strut between a leading and trailing edge of a strut.

It has been established that locating a recess within this boundary allows the strut to be optimised for strength by minimising the stress which is induced in the strut in use.

In will be recognised that when the present disclosure is applied to the leading edge of a strut, the recess(es) extend along an upstream portion of the inner surface of the channel away from the leading edge of a strut measured in a gas flow direction through the casing.

Conversely, when applied to a trailing edge of a strut, the recess(es) extend along a downstream portion of the inner surface of the channel away from the trailing edge of a strut measured in a gas flow direction through the casing.

The recesses may be advantageously applied to each or a subset of the four locations of hub/shroud and leading and trailing edges. Furthermore, depending on the specific engine design, all or a sub-set of struts are provided with recesses proximate to a leading or trailing edge thereof. Thus application is possible selectively to the struts to optimise a given engine. An aspect thus extends to an engine having non-uniform struts, i.e., a sub-set of struts that incorporate a recess and a second sub-set that do not.

A portion of the shroud surrounding the channel may also be provided with a modified profile. Specifically, a portion of the shroud outer surface aligning with the position of the recess on the inner shroud surface may be provided with an increased shroud wall thickness over an area corresponding to the area of the recess. In effect an outer surface of the shroud may have a convex portion on an outer surface mirroring the recess formed on the inner surface. Thus, the wall thickness of the shroud can be maintained whilst benefiting from the advantages of the recess on the inner surface. The increased shroud wall thickness may be in the form of a generally convex portion corresponding generally in shape to the concave recess on the inner surface of the shroud.

It has further been established that the following relationship maintains the shroud strength whilst allowing the advantages applied to the inner surface of the channel to be realised.

Specifically, when
t=shroud case thickness without a modified recess;
d=the thickness of the shroud measured from the deepest part of the recess to the most protruding part of the reinforcement portion or pad;
e=the depth of the recess measured from the inner surface; and
r=the radius of the fillet of curvature at which the recess intersects with the leading edge of the strut;
then the following relationship should be met:
$d \geq t$
$t > e > 0$
$r \geq$ the normal fillet radius between the strut and the shroud/hub.

In one example the increase in thickness of the shroud from an un-modified shroud thickness (reference c in FIG. 6) may be between 3 and 5 mm. Advantageously this may be 4 mm. Similarly, the change in depth of the recess on the inner surface of the shroud (reference e in FIG. 6) may be between 1 mm and 1.6 mm. Advantageously this may be 1.3 mm.

Viewed from another aspect there is provided a turbine exhaust casing comprising an inner hub portion and an outer shroud portion and plurality of struts extending radially between the hub and shroud portions, each strut having a leading edge arranged in use to face an upstream direction of gas flow and a trailing edge arranged in use to face a downstream direction of gas flow, wherein an inner surface of the shroud immediately adjacent to the leading edge of a strut is provided with a recess extending into the shroud inner surface; and an outer surface of the shroud is provided with a reinforcement at a position on the shroud outer surface corresponding to the recess on the inner surface.

Viewed from a still further aspect, there is provided a method of forming an exhaust gas casing for a gas turbine engine, the casing comprising an outer generally cylindrical shroud and an inner generally cylindrical hub and a plurality of struts extending radially between the shroud and the hub, each strut intersecting with the shroud at a first end and the hub at an opposing end, wherein the outer surface of the hub and the opposing inner surface of the shroud define a channel through which gas may pass, said method comprising the step of forming a recess in a portion of the surface of the channel at the intersection of the channel and strut, wherein the recess extends radially inwardly or radially outwardly into the surface of the channel with respect to the surface of the channel surrounding the intersection.

As described herein with respect to the apparatus, it will be recognised that the recess(es) may advantageously be in the form of a generally concave recess extending into the surface of the channel and comprising a continuous and smooth surface.

Modifying the inner surface of the channel (and optionally the outer surface of the shroud) as described herein allows the engine design to be further optimised. Any saving on the size and weight of the strut can have a significant impact on the overall efficiency of the engine over its operational life. The present disclosure also provides for improved fuel efficiency through reduced weight and reduced material usage.

BRIEF SUMMARY OF THE DRAWINGS

Aspects of the disclosure will now be described, by way of example only, with reference to the accompanying figures in which.

Figure 1:
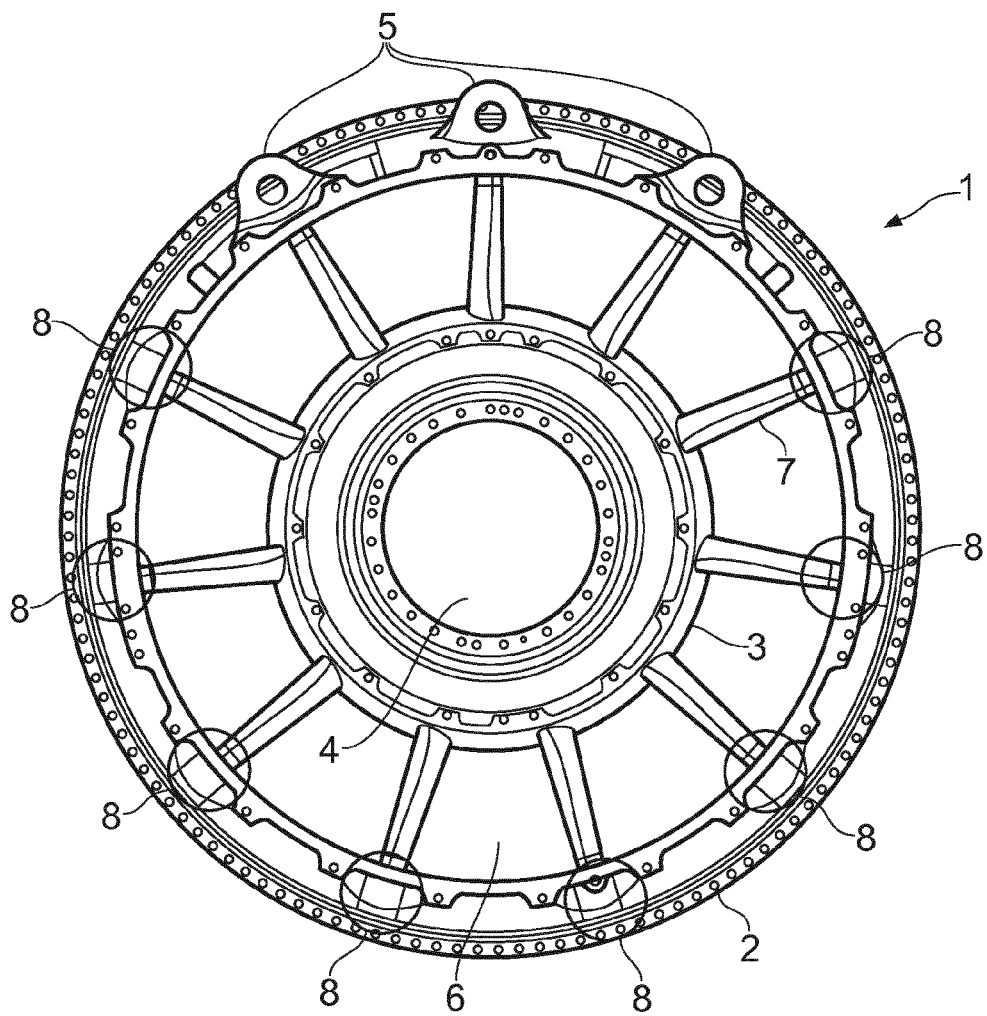
FIG. 1 shows an aft looking forward view of an exhaust gas casing.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention. It will be recognised that the features of the aspects of the invention(s) described herein can conveniently and interchangeably be used in any suitable combination. It will also be recognised that the invention covers not only individual embodiments but also combinations of the embodiments that have been discussed herein.

DETAILED DESCRIPTION

FIG. 1 shows an aft looking forward view of an exhaust gas casing 1 suitable for use in a gas turbine engine. Such a component will be well known to the person skilled in the art of gas turbine engines.

The casing 1 is formed of an outer ring or shroud 2 and a radially inwardly located hub 3 concentric with the shroud 2. Both shroud and hub are concentric with a centrally located and rotatable shaft (not shown) that runs along the length of the engine and is located in the central space 4 within the hub 3. The hub 3 locates bearings and other equipment which support the shaft and allow it to rotate.

The shroud 2 is provided with a plurality of lugs 5 which provide structural couplings to connect the engine to the body of the aircraft.

The radial space between the shroud and the hub defines an annular channel 6 through which gas (exhaust gas in the case of an exhaust gas casing) may pass. Extending between the shroud and hub are a plurality of struts or vanes 7 (described in more detail below).

The struts or vanes 7 serve a number of purposes.

First, the struts provide a mechanical coupling connecting the shroud and hub together and rigidly spacing the shroud from the hub (which itself supports the rotating shaft of the engine). This provides an aft end support and coupling for the engine.

Secondly, the struts or vanes 7 each have an aerodynamic profile to turn the swirling air leaving the combustors towards an axial outlet direction, i.e., directing exhaust gas out of the back of the engine. This is described in more detail below.

Each of the struts 7 has a leading edge, that is an up-stream edge against which the exhaust gas first impinges and a trailing edge, that is the edge downstream of the leading edge.

Described herein is a modification to the casing at the portions of the casing at which the strut meets (or intersects) with the shroud at one end and hub the hub at the other. More specifically the casing is modified to incorporate recesses or depressions proximate to the points at which the struts meet the hub or shroud.

Figure 2:
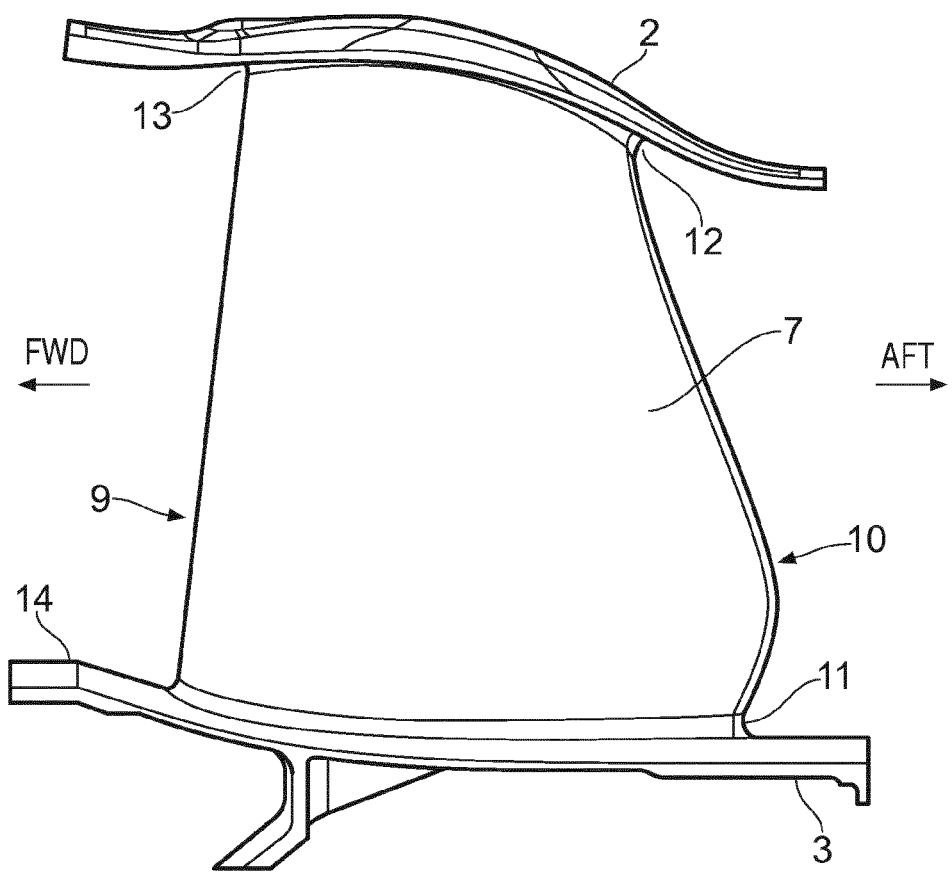
FIG. 2 shows a side elevation of one of the struts 7.

FIG. 2 shows a side elevation of one of the struts 7. Each strut 7 has a leading edge 9 in a forward direction of the engine and a trailing edge 10 in an aft direction of the engine. A radially inward end 11 of the strut 7 is coupled to the hub 3 and at an opposing end of the strut 7 a radially outward end 12 of the strut is coupled to the shroud 2 as shown in FIG. 2. The present disclosure is concerned with portions of the inner surface of the casing (illustrated by reference 13 in FIG. 2) where the leading or trailing edges of the strut meet the inner surface 14 of the channel.

Figure 3:
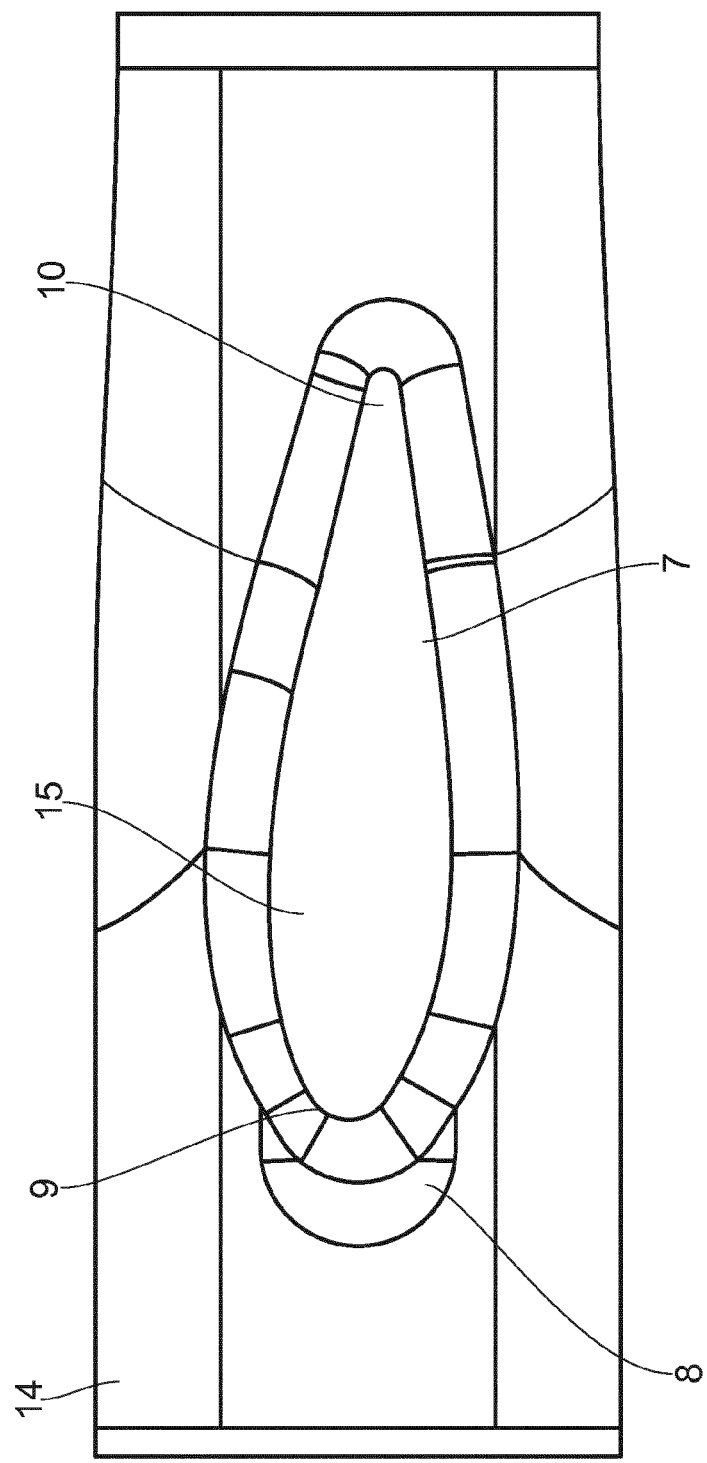
FIG. 3 is a cross-section through a shroud in which the leading edge and trailing edge are shown.
Figure 4:
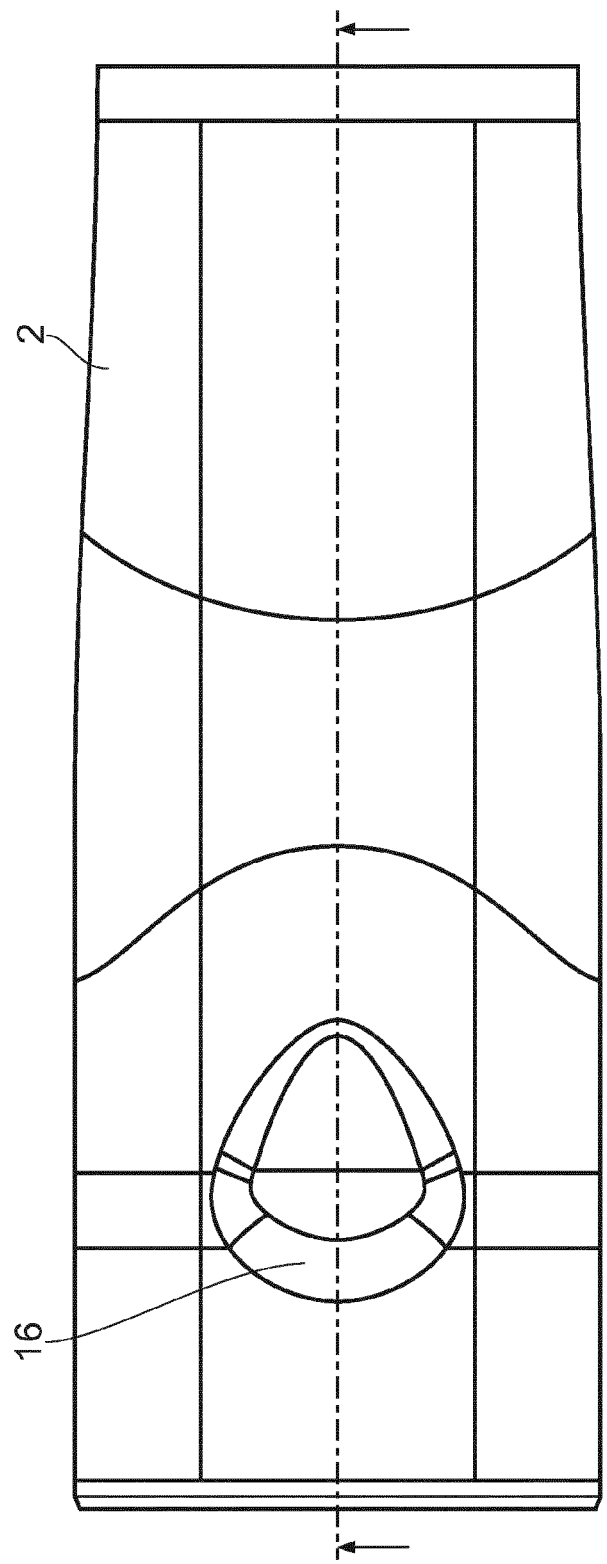
FIG. 4 is a plan view of the outer surface of the shroud viewed radially inwardly.

FIG. 3 is a cross-section through a strut in which the leading edge 9 and trailing edge 10 are shown. The recess or depression 8 formed into the channel surface 14 is also shown. In the example shown in FIG. 3 the depression is only shown at the leading edge. However, the depression may be positioned at either the leading edge, trailing edge or both FIG. 4 is a plan view of the outer surface of the shroud viewed radially inwardly. FIG. 4 illustrates the reinforcement portion 16 which will be described with reference to FIG. 5.

Figure 5:
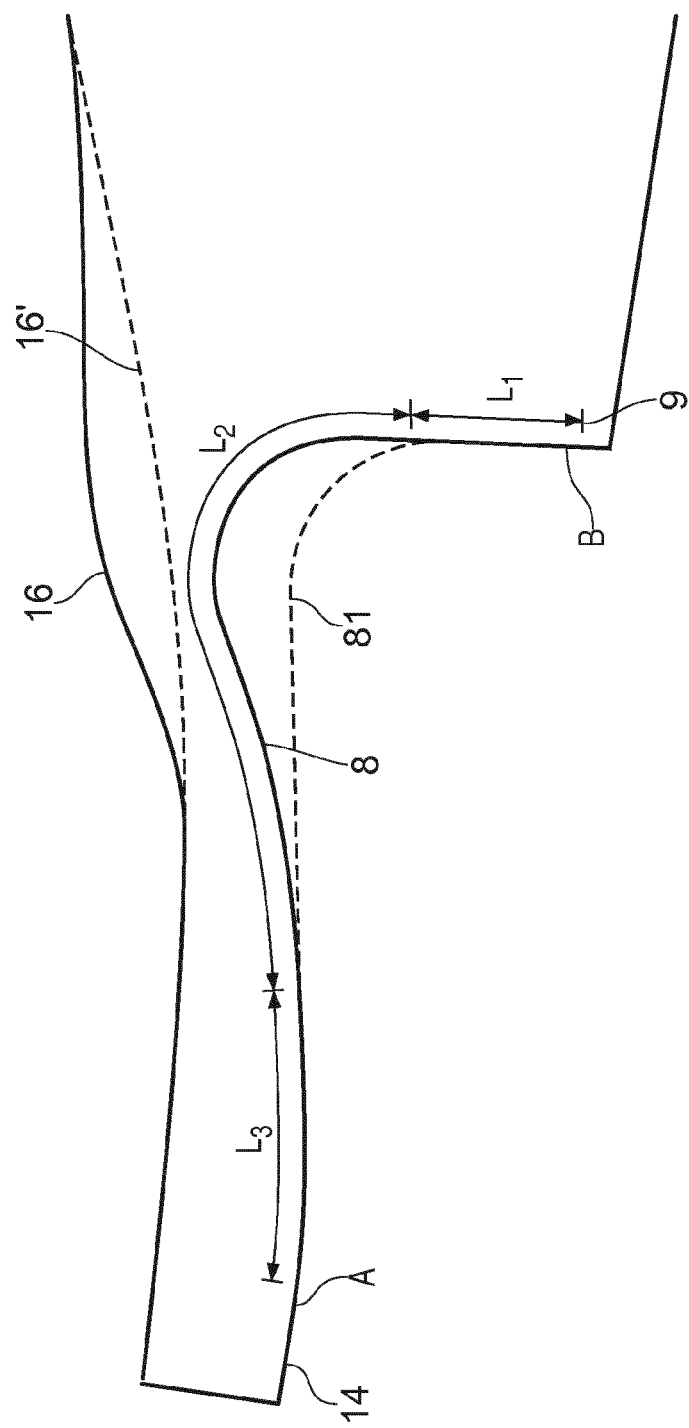
FIG. 5 is a cross-section through section A-A' in FIG. 4.

FIG. 5 is a cross-section through section A-A' in FIG. 4. FIG. 5 illustrates the point at which the strut 7 intersects with the shroud 2 and the way the recess or depression 8 is integrated into the surface geometry of the channel surface 14.

As shown in FIG. 5 the normal geometry of the shroud is shown by dotted line 8' on the inner surface of the shroud and by 16' on the outer surface.

Reference 8 shows the recess extending radially outwardly and into the channel surface. The recess 8 defines a smooth and uninterrupted surface extending from the upstream channel wall at reference A to the leading edge 9 of the strut at reference B.

A smooth and continuous profile is provided which can be sub-divided into three regions L1, L2 and L3.

Region L1 represents a straight portion of the leading edge of the strut;

Region L2 represents the smooth curvature of the recess or divot at the intersection of strut and recess; and Region L3 represents the upstream portion of the recess which intersects with the upstream channel inner surface at reference A.

Each of the three regions intersects smoothly with the next providing a continuous smooth surface that leaves the channel inner surface and extends, in a curve, radially outwardly into the thickness of the shroud immediately before the intersection of strut and inner shroud surface. In effect material is removed from the root of the strut at a point at which it meets the shroud.

As shown in FIGS. 4 and 5 the shroud may be optionally provided with an outer reinforcement portion or pad 16 which effectively thickens the shroud at a portion corresponding to the recess located on the opposing inner surface of the shroud.

Figure 6:
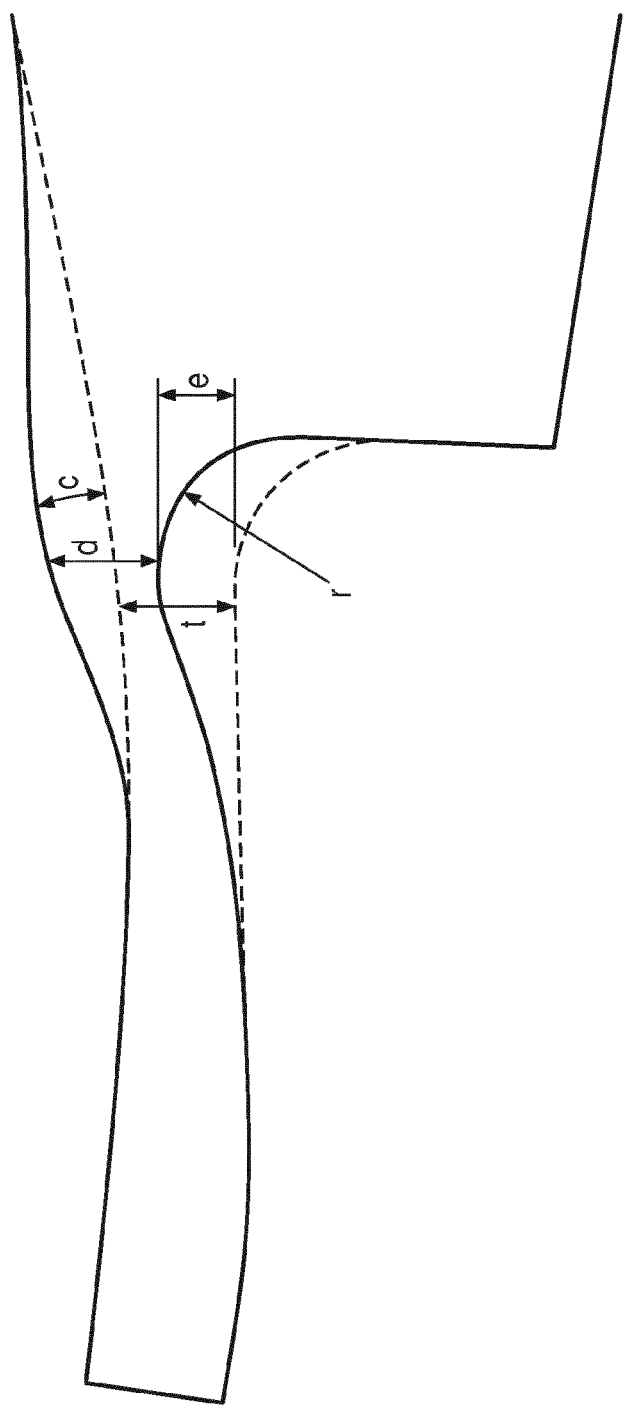
FIG. 6 is an additional cross-sectional view of the leading edge of the strut.

FIG. 6 is an additional cross-sectional view of the leading edge of the strut incorporating the recess or depression. The enlarged portion of FIG. 6 illustrates the relationship within the thickness of the shroud according to the modified shroud arrangement described herein.

Figure 7:
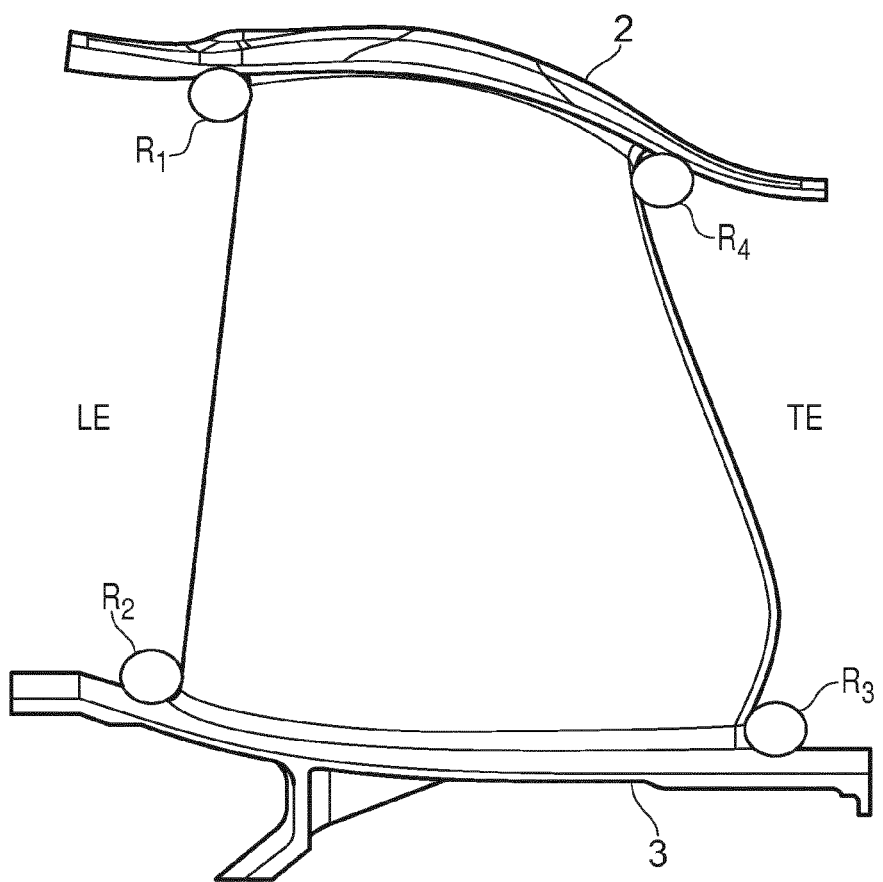
FIG. 7 illustrates the respective positions of the recesses on the leading edge (R1 and R2) and on the trailing edge (R3 and R4)

The shroud thickness at the intersection of the strut and the shroud is arranged according to the following parameters where t=shroud case thickness without a modified recess)
d=the thickness of the shroud measured from the deepest part of the recess to the most protruding part of the reinforcement portion or pad
e=the depth of the recess measured from the inner surface; and
r=the radius of the fillet of curvature at which the recess intersects with the leading edge of the strut
The following Applies:
d>=t
t>e>0
r>=the normal fillet radius between the strut and the shroud/hub FIG. 7 illustrates the respective positions of the recesses on the leading edge (R1 and R2) and on the trailing edge (R3 and R4). The reinforcement portions of pads may be optionally introduced on the outer surface of the shroud at positions corresponding to R1 and R4.

The position of the recess or depression will now be described with reference to FIG. 8 which is a cross-section through a portion of a strut proximate to the intersection of the strut and shroud or hub.

As described herein the recess or depression takes the form of a change in the surface profile of the channel in the area immediately upstream of the leading edge or immediately downstream of the trailing edge.

In the case of a recess at a leading edge of a strut the recess is formed of two portions (a) the smooth fillet or radius that intersects with the radially extending leading edge of the strut and (b) the smooth and continuous surface that extends from the fillet or radius and joins the inner surface of the channel upstream of the radius.

In the case of a recess at a trailing edge the recess is inverted, i.e., there is (a) an upstream smooth fillet or radius that intersects with the radially extending trailing edge of the strut and (b) a smooth and continuous surface that extends from the fillet or radius and joins the inner surface of the channel downstream of the radius.

In both cases the recess must be contained within a zone either upstream of the leading edge or downstream of the trailing edge. This zone or region is described with reference to FIG. 8.

Figure 8:
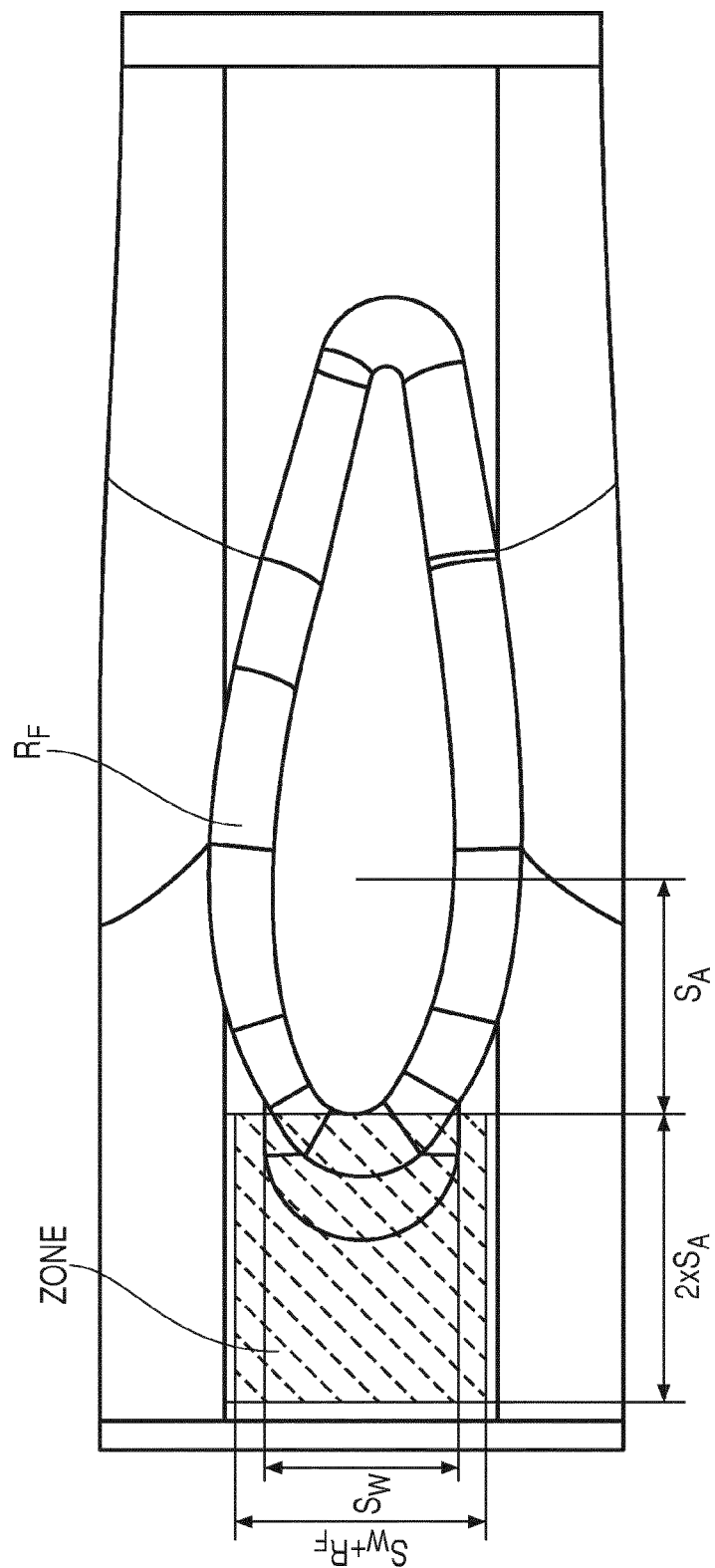
FIG. 8 illustrates the boundary of the zone into which a recess is formed.

Specifically, as illustrated in FIG. 8, the zone is defined as follows:
the radius has a radius of $R_F$
the strut has a maximum width measured perpendicular to its length of $S_W$
the strut has a length between its leading edge and a point of maximum thickness ($S_W$) of the strut of $S_A$; and
wherein the outer periphery of each recess is located within a region defined by:
(a) $2 \times S_A$ from the leading edge of the strut measured away from the strut in an upstream or downstream direction; and
(b) $(S_W + R_F)/2$ measured perpendicularly from a centre line running through the strut between a leading and trailing edge of a strut.

Figure 9:
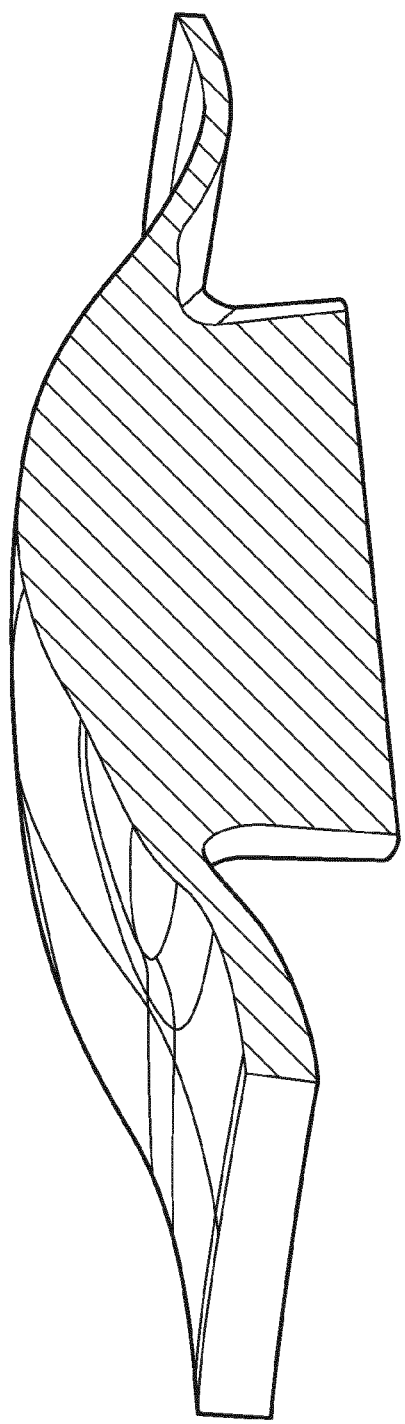
FIGS. 9 and 10 illustrate views of the shroud and hub respectively incorporating the reinforcements and recesses.
Figure 10:
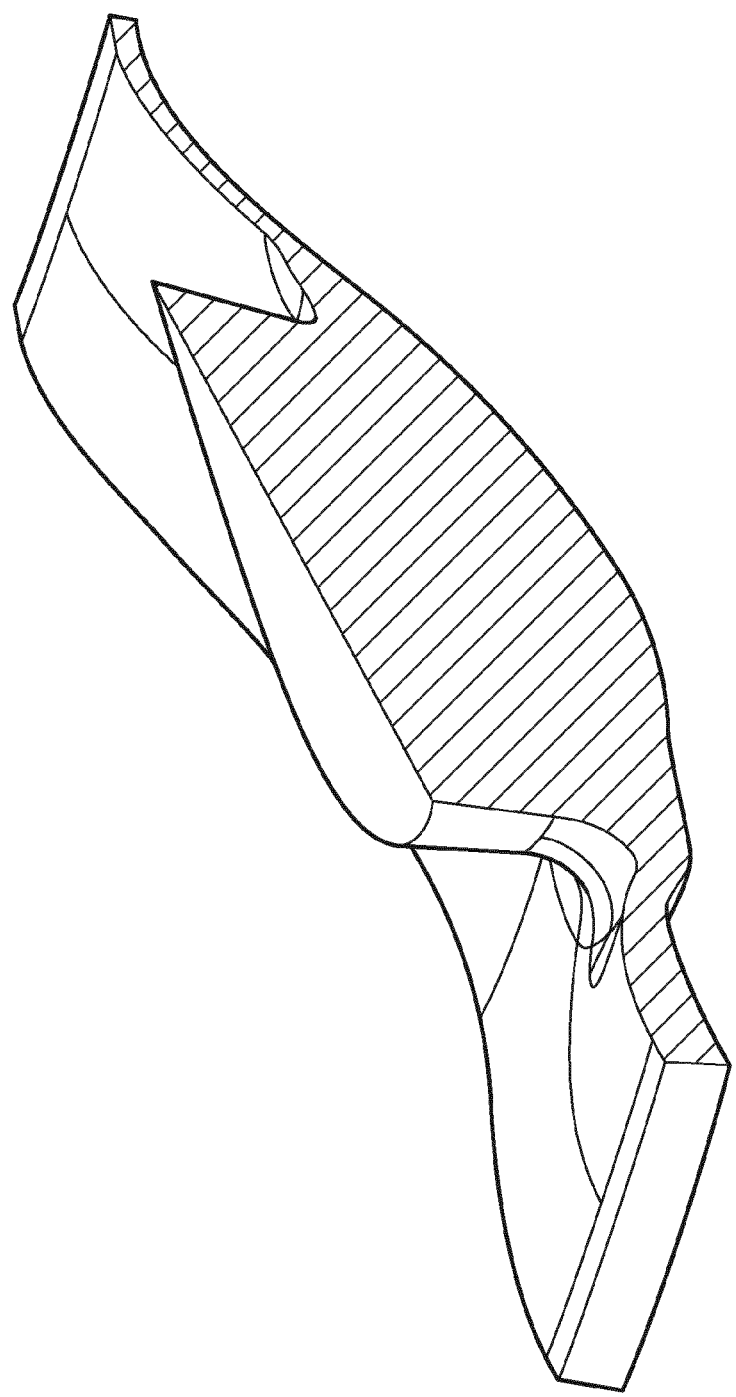

FIGS. 9 and 10 illustrate views of the shroud and hub respectively incorporating the reinforcements and recesses.

It has been established that locating the recesses within the zone shown in FIG. 8 and also illustrated in FIG. 10 provides a surprising technical effect in that the strength and fatigue life of the strut can be improved. Surprisingly, introducing a recess in the specific location described herein not only provides the advantages discussed herein but is not detrimental to the airflow within the casing. Convention dictates that the inner surfaces of the cases must not be interrupted owing to the disruption to the air flow. However, the inventors has established that applying the criteria set out herein allows the advantages of improved strength to be realised whilst not encountering airflow problems.

The invention claimed is:

1. A turbine exhaust casing for a gas turbine engine, comprising:
an outer cylindrical shroud;
an inner cylindrical hub; and
a plurality of struts extending radially between the shroud and the hub, each strut intersecting with the shroud at a first end and with the hub at an opposing end;
wherein an outer surface of the hub and an opposing inner surface of the shroud define a channel through which gas may pass, whereby a surface of the channel includes the outer surface of the hub and the inner surface of the shroud;
wherein, for at least one of the struts, a recess is formed in a portion of the surface of the channel at an intersection of the surface of the channel and the at least one of the struts;
wherein the strut intersects with the shroud or hub at a first intersection, where a smooth fillet extends between an outer surface of the strut and the inner surface of the shroud or the outer surface of the hub, wherein the smooth fillet has a radius of curvature;
wherein the strut intersects with the recess at a second intersection, where the strut intersects with a continuous and smooth surface of the recess; and
wherein:
the radius of curvature has a radius of $R_F$,
the strut has a maximum width measured perpendicular to its length of $S_W$,
the strut has a length between its leading edge and a point of maximum thickness ($S_W$) of the strut of $S_A$; and
wherein the outer periphery of each recess is located within a region defined by:
(a) $2 \times S_A$ from the leading edge of the strut measured away from the strut in an upstream or downstream direction; and
(b) $(S_W + R_F)/2$ measured perpendicularly from a center line running through the strut between a leading and trailing edge of a strut.

2. The turbine exhaust casing of claim 1, wherein the recess extends radially outwardly at the intersection of strut and shroud and radially inwardly at the intersection of strut and hub.

3. The turbine exhaust casing of claim 1, wherein the recess is concave and extends into the surface of channel.

4. The turbine exhaust casing of claim 1, wherein the periphery of the recess intersects with the surface of the channel as a continuous and smooth surface.

5. The turbine exhaust casing of claim 1, wherein the recess extends along an upstream portion of the surface of the channel away from the leading edge of a strut measured in a gas flow direction through the casing.

6. The turbine exhaust casing of claim 1, wherein the recess extends along a downstream portion of the surface of the channel away from the trailing edge of a strut measured in a gas flow direction through the casing.

7. The turbine exhaust casing of claim 1, wherein at least a plurality of the struts are provided with respective recesses proximate to a leading or trailing edge of each respective strut in the plurality of the struts.

8. The turbine exhaust casing of claim 1, wherein a portion of an outer surface of the shroud aligning with the position of the recess on the inner shroud surface is provided with an increased shroud wall thickness over an area corresponding to the area of the recess.

9. The turbine exhaust casing of claim 8, wherein the increased shroud wall thickness is in the form of a convex portion corresponding in shape to the concave recess on the inner surface of the shroud.

10. The turbine exhaust casing of claim 9, wherein the recess and increased shroud wall thickness are complimentary such that the wall thickness of the shroud at the recess is at least as thick as the wall thickness of the remaining parts of the shroud wall.

11. The turbine exhaust casing of claim 10, in which
t=shroud case thickness without a modified recess;
d=the thickness of the shroud measured from the deepest part of the recess to the most protruding part of the reinforcement portion or pad;
e=the depth of the recess measured from the inner surface; and
r=the radius of the fillet of curvature at which the recess intersects with the leading edge of the strut;
and wherein:
d>=t,
t>e>0,
r>=the normal fillet radius between the strut and the shroud/hub.

12. A turbine exhaust casing comprising:
an inner hub portion, an outer shroud portion, and a plurality of struts extending radially between the hub and shroud portions, each strut having a leading edge arranged to face an upstream direction of gas flow and a trailing edge arranged to face a downstream direction of gas flow;
wherein an inner surface of the outer shroud portion immediately adjacent to the leading edge of at least one of the struts is provided with a recess extending into the inner surface of the outer shroud portion;
an outer surface of the outer shroud portion is provided with a reinforcement at a position on the outer surface of the outer shroud portion corresponding to the recess on the inner surface of the outer shroud portion;
the strut intersects with the hub at a first intersection, where a smooth fillet extends between an outer surface of the strut and the outer surface of the hub, wherein the smooth fillet has a radius of curvature;
the strut intersects with the recess at a second intersection, where the strut intersects with a continuous and smooth surface of the recess; and
wherein:
the radius of curvature has a radius of $R_F$,
the strut has a maximum width measured perpendicular to its length of $S_W$,
the strut has a length between its leading edge and a point of maximum thickness ($S_W$) of the strut of $S_A$; and
wherein the outer periphery of each recess is located within a region defined by:
(a) $2 \times S_A$ from the leading edge of the strut measured away from the strut in an upstream or downstream direction; and
(b) $(S_W + R_F)/2$ measured perpendicularly from a center line running through the strut between a leading and trailing edge of a strut.

13. A method of forming an exhaust gas casing for a gas turbine engine, the casing comprising an outer cylindrical shroud; an inner cylindrical hub; and a plurality of struts extending radially between the shroud and the hub, each strut intersecting with the shroud at a first end and with the hub at an opposing end; wherein an outer surface of the hub and an opposing inner surface of the shroud define a channel through which gas may pass, whereby a surface of the channel includes the outer surface of the hub and the inner surface of the shroud, the method comprising
forming a recess in a portion of the surface of the channel at an intersection of the surface of the channel and the at least one of the struts, wherein the recess extends radially inwardly or radially outwardly into the surface of the channel with respect to the surface of the channel surrounding the intersection;
wherein the strut is formed to intersect with the shroud or hub at a first intersection, where a smooth fillet is formed to extend between an outer surface of the strut and the inner surface of the shroud or the outer surface of the hub, wherein the smooth fillet has a radius of curvature;
wherein the strut is formed to intersect with the recess at a second intersection, where the strut intersects with a continuous and smooth surface of the recess; and
wherein:
the radius of curvature has a radius of $R_F$,
the strut has a maximum width measured perpendicular to its length of $S_W$,
the strut has a length between its leading edge and a point of maximum thickness ($S_W$) of the strut of $S_A$; and
wherein the outer periphery of each recess is located within a region defined by:
(a) $2 \times S_A$ from the leading edge of the strut measured away from the strut in an upstream or downstream direction; and
(b) $(S_W + R_F)/2$ measured perpendicularly from a center line running through the strut between a leading and trailing edge of a strut.

14. The method of claim 13, wherein the recess is concave and extends into the surface of channel.

* * * * *